(12) United States Patent
Hieringer et al.

(10) Patent No.: US 7,552,915 B2
(45) Date of Patent: Jun. 30, 2009

(54) MASS EXCHANGE COLUMN WITH EXCHANGE PLATES

(75) Inventors: Stefan Hieringer, Garching/Alz (DE); Anton Moll, Raisting (DE)

(73) Assignee: Linde Aktiengesellschaft, Munich (DE)

( * ) Notice: Subject to any disclaimer, the term of this patent is extended or adjusted under 35 U.S.C. 154(b) by 526 days.

(21) Appl. No.: 11/384,637

(22) Filed: Mar. 20, 2006

(65) Prior Publication Data

US 2006/0214317 A1     Sep. 28, 2006

(30) Foreign Application Priority Data

Mar. 24, 2005   (DE)   ........................ 10 2005 013 855

(51) Int. Cl.
    *B01F 3/04*   (2006.01)
(52) U.S. Cl. .................. 261/114.1; 261/114.5
(58) Field of Classification Search .............. 261/114.1, 261/114.2, 114.3, 114.4, 114.5
    See application file for complete search history.

(56) References Cited

U.S. PATENT DOCUMENTS

| | | | |
|---|---|---|---|
| 4,426,361 A * | 1/1984 | Bushnell | 422/256 |
| 4,738,807 A | 4/1988 | Aitken et al. | |
| 5,049,319 A * | 9/1991 | Nye | 261/114.1 |
| 5,762,668 A * | 6/1998 | Lee et al. | 55/486 |
| 6,003,847 A * | 12/1999 | Lee et al. | 261/114.1 |
| 6,224,043 B1 * | 5/2001 | Fan et al. | 261/114.1 |

FOREIGN PATENT DOCUMENTS

| | | |
|---|---|---|
| EP | 0 706 810 A1 | 4/1996 |
| GB | 2 051 086 A | 1/1981 |

\* cited by examiner

*Primary Examiner*—Scott Bushey
(74) *Attorney, Agent, or Firm*—Cahn & Samuels, LLP

(57) ABSTRACT

A column for mass exchange between a liquid and a gas includes at least one pair of adjacent exchange plates, formed by an upper exchange plate and a lower exchange plate. The column also includes a drain shaft for passing liquid between the upper exchange plate and the lower exchange plate, and a recessed inlet cup located underneath a bottom end of the drain shaft. The bottom of the inlet cup is recessed relative to the surface of the lower exchange plate. The recessed inlet cup extends over only one part of the cross-section of the bottom end of the drain shaft.

15 Claims, 1 Drawing Sheet

MASS EXCHANGE COLUMN WITH EXCHANGE PLATES

BACKGROUND AND SUMMARY OF INVENTION

This application claims priority of German Patent Application No. 102005013855.1 filed Mar. 24, 2005, the disclosure of which is herein incorporated by reference in its entirety.

The present invention relates to a column for mass exchange between a liquid and a gas. The column has at least one pair of adjacent exchange plates, formed by an upper exchange plate and a lower exchange plate; a drain shaft for passing liquid; and an inlet cup located underneath the bottom end of the drain shaft and which has a bottom that is recessed relative to the surface of the lower exchange plate.

Plate columns are often used for mass exchange processes, especially as washing columns or as rectification columns for gas separation. Their basic structure is described in, for example, Winnacker-Küchler, *Chemische Technologie [Chemical Technology]*, Vol. 7, 3rd Edition (1975), Section 3.35, pp. 196-200.

Different types of exchange plates are known, such as, for example, perforated plates, bubble-cap plates, or valve plates. The present invention can be applied to all types of exchange plates.

In so-called crossflow plate columns, the liquid runs transversely to the rising gas over an upper exchange plate and then flows by way of one or more drain shafts to the underlying lower exchange plate. On the exchange plates, the liquid through which the gas has flowed forms an effervescent layer in which gas and liquid enter into intense direct mass exchange.

The "surface" of a plate is defined as the plane that stops the liquid, which flows crosswise over the plate and is in mass exchange with the rising gas, from flowing off directly to the bottom and thus defines the lower interface of the effervescent layer. In a perforated plate, the surface of the plate is formed, for example, by the surface of a perforated sheet from which the plate is conventionally produced.

The spatial terms "upper", "top", "lower", "bottom", "vertical", and the like, refer to the orientation of the column during operation.

Since the pressure in the plate column rises from top to bottom, the pressure is higher in the vapor space of the lower plate than on the upper plate. The liquid therefore banks up in the drain shaft until the weight of the banked liquid is sufficient to convey the liquid into the vapor space of the lower plate. This liquid backup level determines the required plate interval and thus the column height in many cases.

The backup level of the liquid in the drain shaft is determined by several factors.

Generally, the pressure drop of the plate yields the greatest portion for the backup level. The rising gas undergoes this pressure drop when flowing from the lower exchange plate through the exchange elements of the upper exchange plate and when overcoming the hydrostatic height of the effervescent layer of the upper exchange plate.

Generally, the friction term yields a smaller portion for the backup level in the drain shaft and is necessary to force the liquid through an outlet gap or through several outlet openings onto the lower exchange plate. In exchange plates having an inlet weir on the lower plate, which ensures a static liquid seal of the shaft in any case of operation, a significant portion of the entire backup level may be produced.

This additional portion of the backup level is avoided in many modern plates by abandoning a static liquid seal and not using an inlet weir, or by arranging the outlet openings of the shaft above the effervescent layer. The shaft seal is then produced dynamically by the pressure drop that arises on the outlet openings.

It is known from Mayfield et al., Journal of Industrial and Engineering Chemistry (1952), 44, 2238-49 (FIG. 13) to place a recessed drain cup underneath the drain shaft and thus to produce a static liquid seal without an inlet weir. However, this incurs a relatively high cost in the production of the column.

Therefore, an object of the present invention is to devise a plate column with a recessed inlet cup that can be produced economically and at the same time functions advantageously in process engineering terms.

This object is achieved in that the recessed inlet cup is made such that it extends over only part of the cross-section of the bottom end of the drain shaft.

Within the framework of the present invention, it has been ascertained that a relatively small passage area is sufficient for runout of the liquid from the drain shaft onto the lower exchange plate. Therefore, in contrast to the teaching of the prior art, it is not necessary to dip the entire drain shaft into the recessed cup. Rather, one recess in the plate in the area of the passage gap is adequate. This recess can be made easily and economically by a folded sheet metal cup. The latter can be joined to the exchange plate by means of simple connecting elements, for example, rivets. Thus, special effort for sealing the inlet cup relative to the column wall becomes unnecessary. Nevertheless, the favorable effect of the recessed inlet cup can be used for the backup level in the drain shaft and thus for the overall height of the entire column.

The recessed inlet cup extends, for example, over 20% to 60% of the lower cross-sectional surface of the drain shaft, preferably over 25% to 40%.

Preferably, the drain shaft ends above the surface of the lower exchange plate. In this way, the inlet cup by itself no longer forms a static liquid seal. This can be compensated for by conventional measures for producing a dynamic liquid seal by correspondingly configured outlet openings of the drain shaft.

It is more advantageous, however, if, instead, an inlet weir is located on the edge of the inlet cup facing the lower exchange plate and produces a static liquid seal.

Within the framework of the present invention, this inlet weir can be designed very small. In particular, it is advantageous if the inlet weir's height is less than, equal to, or not much higher than the height of the drain weir of the lower exchange plate. "Not much higher" means exceeding the height of the drain weir by 50% or less, preferably by 20% or less, at most preferably by 10% or less, or by 5% or less. The inlet weir is thus lower than the height of the effervescent layer on the lower exchange plate in normal operation. A static liquid seal is produced by interaction of the recessed inlet cup with a low inlet weir without contributing to a significant increase of the liquid backup level. In contrast to dynamic liquid seals, the column is nevertheless suitable for a wide range of loads. The height of the inlet weir may overlap the lower edge of the drain shaft wall by 0 to 20 mm, preferably by 0 to 10 mm.

Here, "normal operation" is defined as operation of the column with a gas and liquid load that lie within the load range for which the column is designed.

With the aid of a recessed inlet cup, a relatively small plate spacing is possible. For high gas loads with a highly expanding effervescent layer, the recessed inlet cup of the upper exchange plate can prevent drainage of the two-phase layer from the lower exchange plate. This disadvantage can be avoided or at least mitigated by the drain shaft's tapering downward, for example, by the wall of the drain shaft facing the lower plate being located obliquely to the vertical. The cross-sectional area of the bottom tapered end of the drain shaft is, for example, 10% to 80% of the cross-sectional area of the top end of the drain shaft, preferably 30% to 50%.

Of course, the present invention can be applied analogously to multiflood plates in which there is more than one drain shaft between a pair of adjacent exchange plates.

The present invention and other details of the invention are explained in more detail below using the embodiments shown in the drawings.

DETAILED DESCRIPTION OF THE INVENTION

Figure 1:
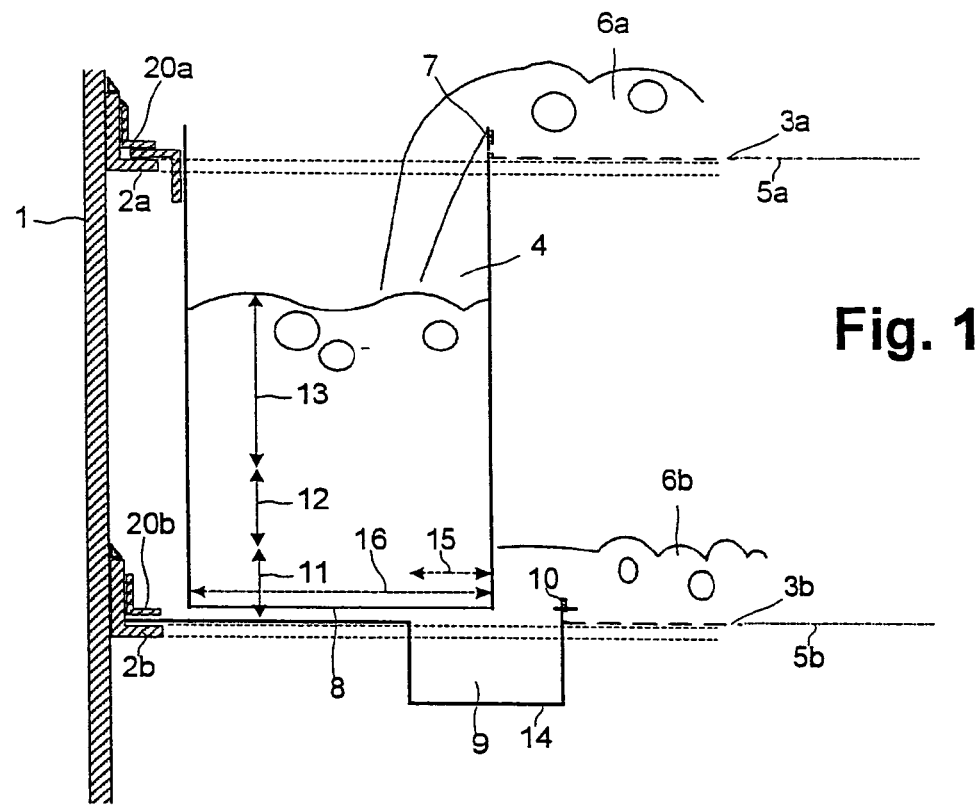
FIG. 1 shows a partial cross-section of a column according to a first embodiment of the present invention.

FIG. 1 shows part of a mass exchange column in cross-section. An annular blind sheet 2a, 2b and a top annular clamp angle 20a, 20b are attached to the inside of the column wall 1 for each plate. They hold an upper exchange plate 3a or a lower exchange plate 3b with the respective drain shaft 4 (shown only for the upper plate) and inlet cup 9 (shown only for the lower plate). The exchange plates 3a, 3b may be any kind of exchange plates, for example, perforated plates. Their "surface" runs in the plane that is shown by the lines 5a, 5b.

During operation of the column, an effervescent layer 6a forms on the upper exchange plate 3a. While the rising gas is flowing in through the openings of the exchange plate and forming bubbles that are rising in the effervescent layer 6a, the liquid flows transversely thereto (to the left in the drawings) over the upper exchange plate 3a. The liquid finally runs out over the drain weir 7 into the drain shaft 4. In the drain shaft, a backup forms with a hydrostatic pressure that conveys the liquid out of the drain shaft's bottom end 8 through the inlet cup 9 and via an inlet weir 10 onto the lower exchange plate 3b on which an effervescent layer 6b forms in the same way.

The backup level is composed of the following portions:
11 static height of the effervescent layer on the plate 3b;
12 friction/passage resistance; and
13 pressure drop portion (pressure drop of the gas flow on the upper plate 3a).

A separate portion for the backup level for the inlet weir 10 is omitted since the top edge of the inlet weir is located underneath the surface of the effervescent layer 6b during normal operation of the column. This is the case when the height of the inlet weir 10 over the surface 5b of the exchange plate 3b is less than, equal to, or not much higher than the height of the drain weir of the same plate.

The bottom 14 of the recessed inlet cup 9 is located underneath the surface 5b of the lower exchange plate 3b. Recessed inlet cup 9 covers only one part 15 of the overall cross-section 16 of the bottom end of the drain shaft 4, for example, about one-fourth in FIG. 1. The inlet cup 9 can thus be easily connected to the exchange plate 3b and jointly with it by way of the support 2b to the column wall 1. Separate suspension and sealing of the inlet cup 9 are not necessary.

If, at high gas loads and small plate distances, the effervescent layer 6b almost fills the entire intermediate space between the two exchange plates 3a, 3b, the inlet cup of the upper plate (not shown in FIG. 1) may prevent the running of the liquid down from the lower exchange plate 3b. In particular, the embodiment of the present invention shown in FIG. 2 offers other advantages in this case.

Figure 2:
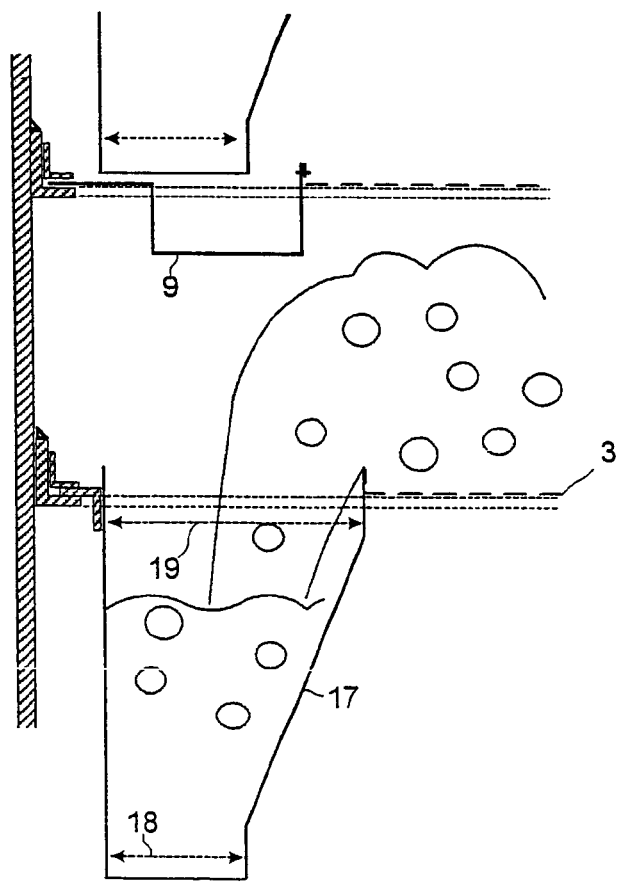
FIG. 2 shows a partial cross-section of a column according to a second embodiment of the present invention with tapering of a drain shaft.

In FIG. 1, all the walls of the drain shaft are arranged vertically. In the embodiment shown in FIG. 2, at least the wall 17 facing the lower exchange plate 3 is tilted relative to the vertical. In this way, the drain shaft 4 tapers downward. The cross-section 18 of the bottom end of drain shaft in FIG. 2 is about 50% of the top cross-section 19 of the drain shaft. The inlet cup 9 covers only one part of this reduced cross-section 18.

Basically, the outer wall of the drain shaft opposite the wall 17 also could be installed, not parallel to the column wall, but rather tilted. The tilt direction would then be opposite the wall 17 in FIG. 2 and would be made at a maximum so that the bottom edge of this wall ends on the edge (to the left in the drawings) of the inlet cup 9.

What is claimed is:

1. A column for mass exchange between a liquid and a gas, comprising:
   at least one pair of adjacent exchange plates comprising an upper exchange plate and a lower exchange plate;
   a drain shaft for passing liquid from the upper exchange plate to the lower exchange plate; and
   a recessed inlet cup located underneath the bottom end of the drain shaft and having a bottom that is recessed relative to the surface of the lower exchange plate for conveying liquid out of the drain shaft and onto the lower exchange plate,
   wherein the recessed inlet cup extends over only part of the cross-section of the bottom end of the drain shaft.

2. A column according to claim 1, wherein the drain shaft ends above the surface of the lower exchange plate.

3. A column according to claim 1, wherein the recessed inlet cup covers 20% to 60% of the cross-section of the bottom end of the drain shaft.

4. A column according to claim 1, further comprising an inlet weir located on an edge of the inlet cup facing the lower exchange plate.

5. A column according to claim 4, wherein the lower exchange plate comprises a drain weir, and wherein the height of the inlet weir is less than or equal to the height of the drain weir.

6. A column according to claim 4, wherein the lower exchange plate comprises a drain weir, and wherein the height of the inlet weir exceeds the height of the drain weir by 50% or less.

7. A column according to claim 1, wherein at least one wall of the drain shaft tapers downward.

8. A column according to claim 7, wherein the wall of the drain shaft facing the lower exchange plate tapers downward and is located obliquely to the vertical.

9. A column according to claim 4, wherein a height of the inlet weir overlaps the bottom end of the drain shaft by 10 to 20 mm.

10. A column according to claim 1, wherein a liquid backup level in the drain shaft comprises a static height portion of an effervescent layer in the lower exchange plate, a friction and resistance portion, and a pressure drop portion.

11. A column according to claim 1, wherein the drain shaft extends downwardly from the upper exchange plate to a top clamp for the lower exchange plate.

12. A column according to claim 7, wherein the drain shaft comprises an outer wall parallel to a column wall and an inner wall facing the lower exchange plate that tapers downwardly so that a bottom cross-section of the drain shaft is about 50% of the top cross-section of the drain shaft.

13. A column according to claim 1, wherein the upper exchange plate comprises a perforated sheet having openings over its surface for allowing a gas to flow through.

14. A column according to claim 13, wherein the lower exchange plate comprises a perforated sheet having openings over its surface for allowing a gas to flow through.

15. A method for mass exchange between a liquid and a gas, comprising:
   flowing liquid over the upper exchange plate of the column according to claim 1;
   forming an effervescence layer on the upper exchange plate by rising gas flowing through openings of the upper exchange plate;
   running liquid over a drain weir and down a drain shaft forming a liquid backup in the drain shaft; and
   conveying the liquid through the recessed inlet cup and over the inlet weir.

* * * * *